(12) United States Patent
Sayyed et al.

(10) Patent No.: US 12,504,977 B2
(45) Date of Patent: Dec. 23, 2025

(54) SYSTEMS AND METHODS FOR HANDLING PLATFORM-AGNOSTIC PRE-BOOT HEALTH INFORMATION IN AN INFORMATION HANDLING SYSTEM

(71) Applicant: Dell Products L.P., Round Rock, TX (US)

(72) Inventors: Ibrahim Sayyed, Georgetown, TX (US); Alan H. Abdelhalim, Pflugerville, TX (US); Adolfo S. Montero, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/672,132

(22) Filed: May 23, 2024

(65) Prior Publication Data

US 2025/0362925 A1   Nov. 27, 2025

(51) Int. Cl.
*G06F 11/00* (2006.01)
*G06F 9/4401* (2018.01)
*G06F 11/22* (2006.01)
*G06F 11/30* (2006.01)

(52) U.S. Cl.
CPC ........ *G06F 9/4401* (2013.01); *G06F 11/2284* (2013.01); *G06F 11/3065* (2013.01)

(58) Field of Classification Search
CPC . G06F 9/4401; G06F 11/2284; G06F 11/3065
See application file for complete search history.

(56) References Cited

U.S. PATENT DOCUMENTS

2014/0297999 A1\* 10/2014 Kim ..................... G06F 9/4401
713/1

\* cited by examiner

*Primary Examiner* — Jason B Bryan
(74) *Attorney, Agent, or Firm* — Fogarty LLP

(57) ABSTRACT

Systems and methods for handling platform-agnostic pre-boot health information in an Information Handling System (IHS) are described. In an illustrative, non-limiting embodiment, an IHS may include a processor; and a memory coupled to the processor, the memory having program instructions stored thereon that, upon execution, cause the IHS to: create an Advanced Configuration and Power Interface (ACPI) table, by a Basic Input/Output System (BIOS) during boot of the IHS, wherein the ACPI table comprises telemetry data and an identifier; and provide the ACPI table to an Operating System (OS) application, wherein the host OS application is configured to select one of a plurality of parsers to process the ACPI table based, at least in part, upon the identifier.

20 Claims, 5 Drawing Sheets

SYSTEMS AND METHODS FOR HANDLING PLATFORM-AGNOSTIC PRE-BOOT HEALTH INFORMATION IN AN INFORMATION HANDLING SYSTEM

FIELD

This disclosure relates generally to Information Handling Systems (IHSs), and more specifically, to systems and methods for handling platform-agnostic preboot health information in an IHS.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use, such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

Systems and methods for handling platform-agnostic pre-boot health information in an Information Handling System (IHS). In an illustrative, non-limiting embodiment, an IHS may include a processor; and a memory coupled to the processor, the memory having program instructions stored thereon that, upon execution, cause the IHS to: create an Advanced Configuration and Power Interface (ACPI) table, by a Basic Input/Output System (BIOS) during boot of the IHS, wherein the ACPI table comprises telemetry data and an identifier; and provide the ACPI table to an Operating System (OS) application, wherein the host OS application is configured to select one of a plurality of parsers to process the ACPI table based, at least in part, upon the identifier.

The OS application may include a diagnostics or telemetry application. The identifier may provide an indication of at least one of: a type of the processor, a model of the processor, or a vendor of the processor. Additionally, or alternatively, the identifier may provide an indication of a schema of the ACPI table.

The telemetry data may include device heath data retrieved from a device in a boot path of the IHS. The device health data may include data collected by the device during a POST of the device. The ACPI table may include a Platform Health Assessment Table (PHAT). Additionally, or alternatively, the ACPI table may include a vendor-specific ACPI table.

The BIOS may be configured to add health device information for devices in a boot path to the vendor-specific ACPI table during the boot. In response to the identifier indicating a first type, model, or vendor of the processor, the OS application may be configured to select a first parser, and wherein in response to the identifier indicating a second type, model, or vendor of the processor, the OS application is configured to select a second parser.

The first type, model, or vendor of the processor may identify a CISC processor, and the second type, model, or vendor of the processor identifies a RISC processor. The identifier may indicate a version of the parser, and the host OS may be configured to update the parser to the version in response to the identifier.

In another illustrative, non-limiting embodiment, an IHS, a method may include: creating an ACPI table, by a BIOS during boot of the IHS, where the ACPI table comprises telemetry data and a SOC vendor value; and providing the ACPI table to an OS application, where the host OS application is configured to select one of a plurality of parsers to process the ACPI table based, at least in part, upon the value.

The device health data may include data collected by a device during a POST of the device, and the device may be selected among: a battery, a hard drive, a memory, a Peripheral Component Interconnect (PCI) controller, a cable, or a cooling fan.

The BIOS may be configured to add health device information for devices in a boot path to the ACPI table during the boot. In response to the value indicating a first type, model, or vendor of the processor, the OS application may be configured to select a first parser, and in response to the identifier indicating a second type, model, or vendor of the processor, the OS application may be configured to select a second parser.

In yet another illustrative, non-limiting embodiment, a hardware memory device may have program instructions stored thereon that, upon execution by a processor, cause the processor to: request, by a OS application, device health data; and provide, to the OS application from a BIOS, an ACPI table, where the ACPI table includes telemetry data and an identifier of the processor, and where the host OS application is configured to select one of a plurality of parsers to process the ACPI table based, at least in part, upon the identifier.

The processor may include an asymmetric multiprocessor, and the identifier may be usable to identify at least one of: each processor of the asymmetric multiprocessor, or each parser usable to parse an ACPI table or a portion thereof corresponding to each processor. In response to the value indicating a first type, model, or vendor of the processor, the OS application may be configured to select a first parser, where in response to the identifier indicating a second type, model, or vendor of the processor, the OS application may be configured to select a second parser. The first type, model, or vendor of the processor identifies a CISC processor, and the second type, model, or vendor of the processor identifies a RISC processor.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various Input/Output (I/O) devices, such as a keyboard, a mouse, touchscreen, and/or a video display. An IHS may also include one or more buses operable to transmit communications between the various hardware components.

The terms "heterogenous computing platform," "heterogenous processor," or "heterogenous platform," as used herein, refer to an Integrated Circuit (IC) or chip (e.g., a System-On-Chip or "SoC," a Field-Programmable Gate Array or "FPGA," an Application-Specific Integrated Circuit or "ASIC," etc.) containing a plurality of discrete processing circuits or semiconductor Intellectual Property (IP) cores (collectively referred to as "SoC devices" or simply "devices") in a single electronic or semiconductor package, where each device has different processing capabilities suitable for handling a specific type of computational task. Examples of heterogenous processors include, but are not limited to: QUALCOMM's SNAPDRAGON, SAMSUNG's EXYNOS, APPLE's "A" SERIES, etc., which typically include ARM core(s).

The term "hardware-based security architecture," as used herein, refers to security technologies that provide hardware isolation for secure code execution within a heterogenous computing platform and/or IHS. A hardware-based security architecture implements its security features and/or enclaves at the hardware level, built directly into the processor and other hardware components of the IHS, thus providing robust security capabilities that are less vulnerable to attacks. Examples of hardware-based security architectures include, but are not limited to: ARM's TRUSTZONE, APPLE's T2 SECURITY CHIP, GOOGLE'S TITAN SECURITY CHIPS, etc. Each architecture may execute its own Operating System (OS) distinct from any host OS or service OS of the IHS.

Figure 1:
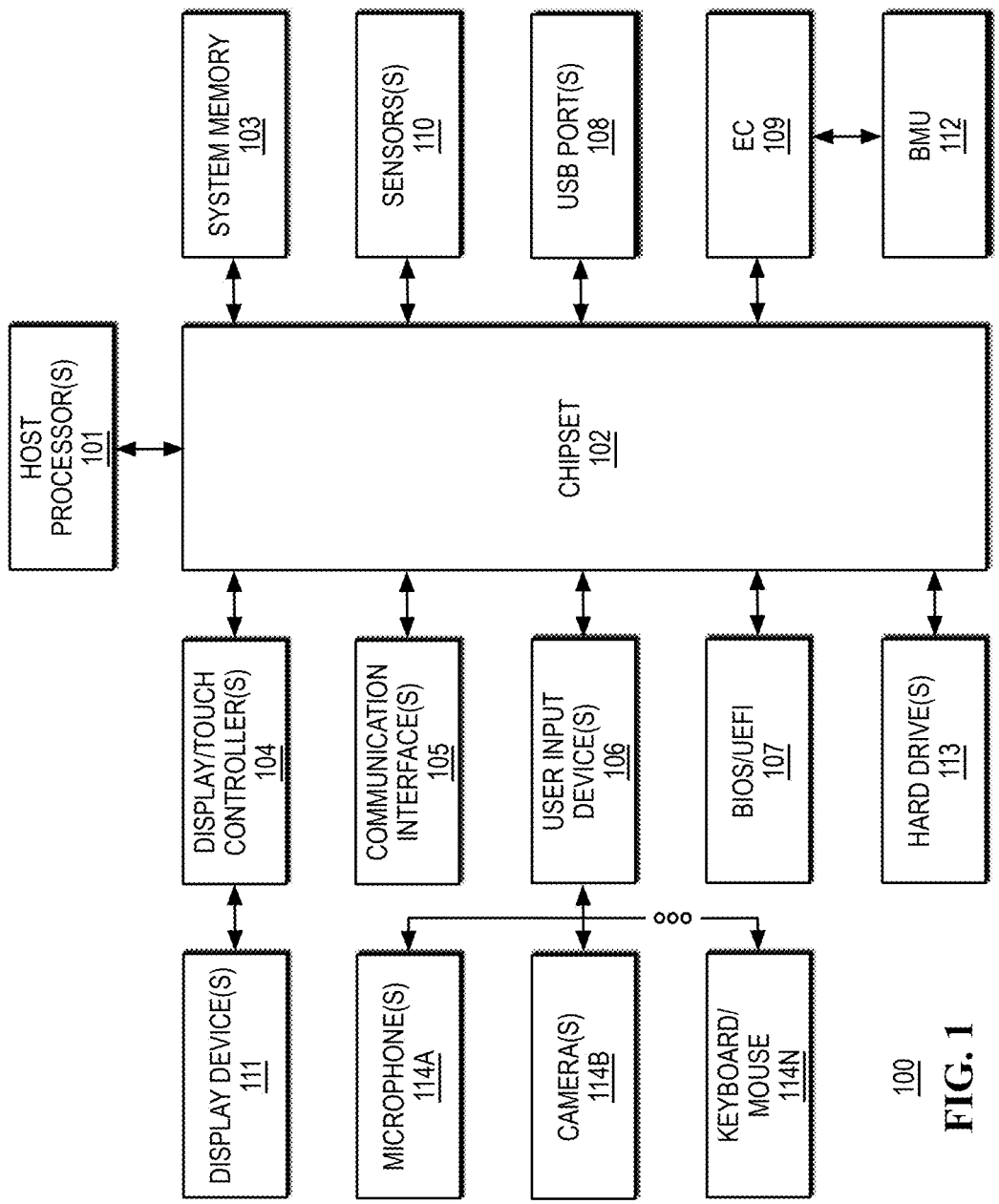
FIG. 1 is a diagram illustrating examples of components of an Information Handling System (IHS), according to some embodiments.

FIG. 1 is a block diagram of examples of components of IHS 100, according to some embodiments. As shown, IHS 100 includes host processor(s) 101. In various embodiments, IHS 100 may be a single-processor system, or a multi-processor system including two or more processors. Host processor(s) 101 may include any processor capable of executing program instructions, such as an INTEL/AMD x86 processor, or any general-purpose or embedded processor implementing any of a variety of Instruction Set Architectures (ISAs), such as a Complex Instruction Set Computer (CISC) ISA, a Reduced Instruction Set Computer (RISC) ISA (e.g., one or more ARM core(s), or the like).

IHS 100 includes chipset 102 coupled to host processor(s) 101. Chipset 102 may provide host processor(s) 101 with access to several resources. In some cases, chipset 102 may utilize a QuickPath Interconnect (QPI) bus to communicate with host processor(s) 101. Chipset 102 may also be coupled to communication interface(s) 105 to enable communications between IHS 100 and various wired and/or wireless networks, such as ETHERNET, WIFI, BLUETOOTH (BT), cellular or mobile networks (e.g., Code-Division Multiple Access or "CDMA," Time-Division Multiple Access or "TDMA," Long-Term Evolution or "LTE," etc.), satellite networks, or the like.

Communication interface(s) 105 may be used to communicate with peripherals devices (e.g., BT speakers, headsets, etc.). Moreover, communication interface(s) 105 may be coupled to chipset 102 via a Peripheral Component Interconnect Express (PCIe) bus, or the like. Chipset 102 may be coupled to display and/or touchscreen controller(s) 104, which may include one or more Graphics Processor Units (GPUs) on a graphics bus, such as an Accelerated Graphics Port (AGP) or PCIe bus. As shown, display controller(s) 104 may provide video or display signals to one or more display device(s) 111.

Display device(s) 111 may include Liquid Crystal Display (LCD), Light Emitting Diode (LED), organic LED (OLED), or other thin film display technologies. Display device(s) 111 may include a plurality of pixels arranged in a matrix, configured to display visual information, such as text, two-dimensional images, video, three-dimensional images, etc. In some cases, display device(s) 111 may operate as a single continuous display, rather than two discrete displays.

Chipset 102 may provide host processor(s) 101 and/or display controller(s) 104 with access to system memory 103. In various embodiments, system memory 103 may be implemented using any suitable memory technology, such as static RAM (SRAM), dynamic RAM (DRAM) or magnetic disks, or any nonvolatile/Flash-type memory, such as a Solid-State Drive (SSD), Non-Volatile Memory Express (NVMe), or the like.

In certain embodiments, chipset 102 may also provide host processor(s) 101 with access to one or more USB ports 108, to which one or more peripheral devices may be coupled (e.g., integrated or external webcams, microphones, speakers, etc.). Chipset 102 may further provide host processor(s) 101 with access to one or more hard disk drives, solid-state drives, optical drives, or other removable-media drives 113.

Chipset 102 may also provide access to one or more user input devices 106, for example, using a super I/O controller or the like. Examples of user input devices 106 include, but are not limited to, microphone(s) 114A, camera(s) 114B, and keyboard/mouse 114N. Other user input devices 106 may include a touchpad, stylus or active pen, totem, etc. Each of user input devices 106 may include a respective controller (e.g., a touchpad may have its own touchpad controller) that interfaces with chipset 102 through a wired or wireless connection (e.g., via communication interfaces(s) 105). In some cases, chipset 102 may also provide access to one or more user output devices (e.g., video projectors, paper printers, 3D printers, loudspeakers, audio headsets, Virtual/Augmented Reality (VR/AR) devices, etc.).

In certain embodiments, chipset 102 may further provide an interface for communications with one or more hardware sensors 110. Sensor(s) 110 may be disposed on or within the chassis of IHS 100, or otherwise coupled to IHS 100, and may include, but are not limited to: electric, magnetic, radio, optical (e.g., camera, webcam, etc.), infrared, thermal, force, pressure, acoustic (e.g., microphone), ultrasonic, proximity, position, deformation, bending, direction, movement, velocity, rotation, gyroscope, Inertial Measurement Unit (IMU), accelerometer, etc.

Basic Input/Output System (BIOS)/Unified Extensible Firmware Interface (UEFI) 107 is coupled to chipset 102. In some situations, the terms "BIOS" and "UEFI" may be used interchangeably. In operation, BIOS/UEFI 107 provides an abstraction layer that allows a host OS to interface with certain hardware components utilized by IHS 100.

When IHS 100 is powered on, host processor(s) 101 may utilize program instructions of BIOS/UEFI 107 to initialize and test hardware components coupled to IHS 100, and to load host OS 312 for use by IHS 100. As used herein, the term "pre-boot" refers to the period of time, processes, and/or environment between the initialization of host processor(s) 101 and its taking over by host OS 312, after host OS 312 is loaded and operational.

Through a hardware abstraction layer provided by BIOS/UEFI 107, software stored in system memory 103 and executed by host processor(s) 101 may interface with certain I/O devices that are coupled to IHS 100.

Embedded Controller (EC) 109 (sometimes referred to as a Baseboard Management Controller or "BMC") includes a microcontroller unit or processing core dedicated to handling selected IHS operations not ordinarily handled by host processor(s) 101. Examples of such operations may include, but are not limited to: power sequencing, power management, receiving and processing signals from a keyboard or touchpad, as well as operating chassis buttons and/or switches (e.g., power button, laptop lid switch, etc.), receiving and processing thermal measurements (e.g., performing cooling fan control, CPU and GPU throttling, and emergency shutdown), controlling indicator Light-Emitting Diodes or "LEDs" (e.g., caps lock, scroll lock, num lock, battery, ac, power, wireless LAN, sleep, etc.), managing a battery charger and a battery, enabling remote management, diagnostic tests (or "diagnostics"), remediation over an OOB or sideband network, etc.

Unlike other devices in IHS 100, EC 109 may be operational from the time IHS 100 is first powered on, before other devices are fully running or even powered. As such, EC 109 firmware may be responsible for interfacing with a power adapter to manage the various power states that may be supported by IHS 100. Power operations of the EC 109 may also provide other components of the IHS 100 with power status information for the IHS, such as whether IHS 100 is operating from battery power or is plugged into an AC power source. Firmware instructions utilized by EC 109 may be used to manage other core operations of IHS 100 (e.g., turbo modes, maximum operating clock frequencies of certain components, etc.).

From the perspective of users, IHS 100 may appear to be either "on" or "off," without any other detectable power states. In some embodiments, however, an IHS 100 may support multiple power states that may correspond to the states defined in the Advanced Configuration and Power Interface (ACPI) specification, such as: S0, S1, S2, S3, S4, S5, and G3.

EC 109 may implement operations for detecting certain changes to the physical configuration or posture of IHS 100 (such as a laptop computer). For instance, when IHS 100 as a 2-in-1 laptop/tablet form factor, EC 109 may receive inputs from a lid position or hinge angle sensor 110, and may use those inputs to determine: whether the two sides of IHS 100 have been latched together to a closed position or a tablet position, the magnitude of a hinge or lid angle, etc. In response to these changes, EC 109 may enable or disable certain features of IHS 100 (e.g., front or rear facing camera, etc.).

In this manner, EC 109 may identify any number of IHS physical postures, including, but not limited to: laptop, stand, tablet, or book. For example, when an integrated display 111 of IHS 100 is open with respect to a horizontal, face-up position of an integrated keyboard, EC 109 may determine IHS 100 to be in a laptop posture. When an integrated display 111 of IHS 100 is open with respect to a horizontal keyboard portion, but the keyboard is facing down (e.g., its keys are against the top surface of a table), EC 109 may determine IHS 100 to be in a kickstand posture. When the back of an integrated display 111 is closed against the back of the keyboard portion of an IHS, EC 109 may determine IHS 100 to be folded in a tablet posture. When IHS 100 has two integrated displays 111 that are open side-by-side (e.g., in a hybrid laptop with displays in both panels), EC 109 may determine an IHS 100 to be in a book posture. When an IHS 100 is determined to be in a book posture, EC 109 may also determine if the display(s) 111 of IHS 100 are arranged in a landscape or portrait orientation, relative to the user.

In some implementations, EC 109 may be installed as part of a Trusted Execution Environment (TEE) component to the motherboard of IHS 100. As a component with hardware root-of-trust (ROT), EC 109 may be further configured to calculate hashes or signatures that uniquely identify individual components of IHS 100. In such scenarios, EC 109 may calculate a hash value based on the configuration of a hardware and/or software component coupled to IHS 100. For instance, EC 109 may calculate a hash value based on all firmware and other code or settings stored in an onboard memory of a hardware component.

Hash values may be calculated as part of a trusted process of manufacturing IHS 100 and may be maintained in secure storage as a reference signature. EC 109 may later recalculate a hash value based on instructions and settings loaded for use by a hardware component of IHS 100 and may compare the calculated value against the reference hash value to determine if any modifications have been made to the component, thus indicating that the component has been compromised. As such, EC 109 may validate the integrity of hardware and software components installed in IHS 100.

In some embodiments, EC 109 may provide an OOB (Out-Of-Band) or sideband channel that allows an Information Technology Decision Maker (ITDM) or Original Equipment Manufacturer (OEM) to manage various settings and configurations of an IHS 100. OOB is used in contradistinction with "in-band" communication channels that operate only after networking 105 other interfaces of the IHS have been initialized, and the OS of the IHS has been successfully booted.

In various embodiments, IHS 100 may be coupled to an external power source through an AC adapter, power brick, or the like. The AC adapter may be removably coupled to a battery charge controller to provide IHS 100 with a source of DC power provided by battery cells of a battery system in the form of a battery pack (e.g., a lithium ion or "Li-ion" battery pack, or a nickel metal hydride or "NiMH" battery pack including one or more rechargeable batteries). Battery Management Unit (BMU) 112 may be coupled to EC 109 and it may include, for example, an Analog Front End (AFE), storage (e.g., non-volatile memory), and a microcontroller. In some cases, BMU 112 may be configured to collect and store information, and to provide that information to EC 109.

Examples of information collectible by BMU 112 may include, but are not limited to: operating conditions (e.g., battery operating conditions including battery state information such as battery current amplitude and/or current direction, battery voltage, battery charge cycles, battery state of charge, battery state of health, battery temperature, battery usage data such as charging and discharging data; and/or IHS operating conditions such as processor operating speed data, system power management and cooling system settings, state of "system present" pin signal), environmental or context information (e.g., such as ambient temperature, relative humidity, system geolocation measured by GPS or triangulation, time and date, etc.), etc.

In various embodiments, EC 109 may be coupled (e.g., via a GPIO pin) to any of a plurality of IHS components including, but not limited to: a fan, a cable, a battery, a temperature sensor, or a display. Moreover, EC 109 may be configured to perform or trigger the performance of any number of diagnostic operations for any of these components. For example, in some cases EC 109 may be configured to request that display 111 perform a Built-In-Self-Test (BIST) and to return BIST results to EC 109 upon completion. In other cases, however, EC 109 may itself run the diagnostic operation.

In some embodiments, IHS 100 may not include all components shown in FIG. 1. In other embodiments, IHS 100 may include other components in addition to those shown in FIG. 1. Furthermore, some components illustrated as separate components in FIG. 1 may instead be integrated with other components, such that all or a portion of the operations executed by the illustrated components may instead be executed by the integrated component.

For instance, in various embodiments, host processor(s) 101 and/or other components shown in FIG. 1 (e.g., chipset 102, display controller(s) 104, communication interface(s) 105, EC 109, etc.) may be replaced by devices within a heterogenous computing platform. As such, IHS 100 may assume different form factors including, but not limited to: servers, workstations, desktops, laptops, appliances, video game consoles, tablets, smartphones, etc.

Historically, IHSs with desktop and laptop form factors have had conventional host OSs executed on INTEL or AMD's "x86"-type processors. Other types of processors, such as ARM processors, have been used in smartphones and tablet devices, which typically run thinner, simpler, and/or mobile OSs (e.g., ANDROID, IOS, WINDOWS MOBILE, etc.). More recently, however, IHS manufacturers have started producing fully-fledged desktop and laptop IHSs equipped with ARM-based, heterogenous computing platforms. Accordingly, host OSs (e.g., WINDOWS on ARM) have been developed to provide users with a familiar OS experience on those platforms.

Figure 2:
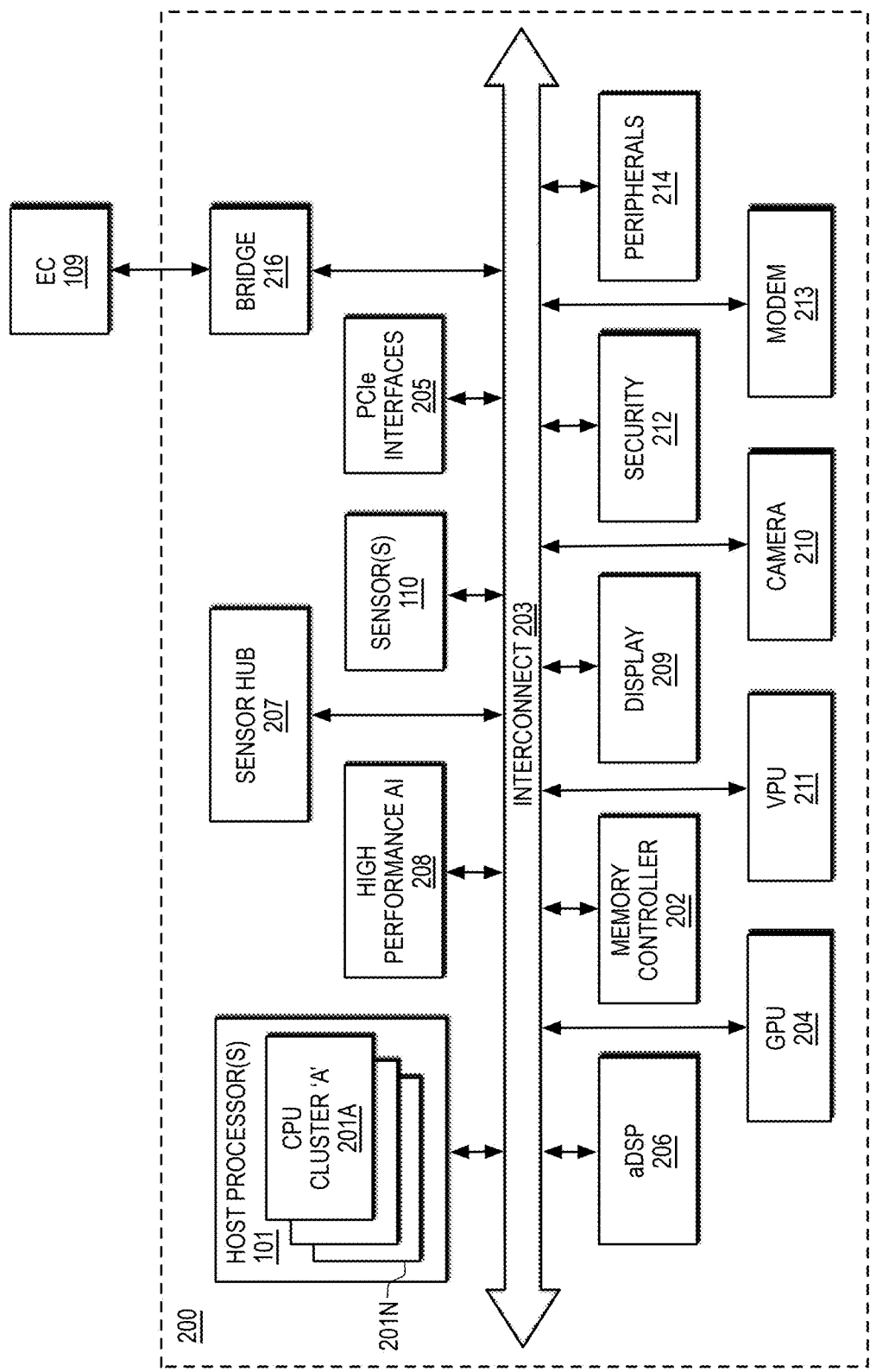
FIG. 2 is a diagram illustrating an example of a heterogenous computing platform configured to implement one or more aspects of an IHSs, according to some embodiments.

FIG. 2 is a diagram illustrating an example of heterogenous computing platform 200 which may be implemented as part of IHS 100 and/or it may replace certain components shown in FIG. 1 (e.g., host processor(s) 101)). In various embodiments, heterogenous computing platform 200 may be implemented as one or more SoCs, FPGAs, ASICs, or the like.

Heterogenous computing platform 200 may include one or more discrete and/or segregated devices or components, each having a different set of processing capabilities suitable for handling a particular type of computational task. When each device in platform 200 is tasked with executing only the types of computational tasks that it is specifically designed to execute, the overall power consumption of heterogenous computing platform 200 is reduced.

In various implementations, some of the devices in heterogenous computing platform 200 may include their own microcontroller(s) or core(s) (e.g., ARM core(s)) and corresponding firmware. In some cases, a device in platform 200 may also include its own hardware-embedded accelerator (e.g., a secondary or co-processing core coupled to a main core). Each device in heterogenous computing platform 200 may be accessible through a respective Application Programming Interface (API). Additionally, or alternatively, some devices in heterogenous computing platform 200 may execute their own OS. Additionally, or alternatively, one or more of the devices of heterogenous computing platform 200 may be virtual devices.

In the embodiment illustrated in FIG. 2, heterogenous computing platform 200 includes CPU clusters 201A-N that may correspond to system processor(s) 101, and that are intended to perform general-purpose computing operations. Each of CPU clusters 201A-N may include one or more processing cores and cache memories. In operation, CPU clusters 201A-N are available and accessible to the IHS's host OS 312 (e.g., WINDOWS on ARM) and other applications executed by IHS 100.

CPU clusters 201A-N may be coupled to memory controller 202 via internal interconnect fabric 203. Memory controller 202 may be responsible for managing system memory access for all of devices connected to internal interconnect fabric 203, which may include any communication bus suitable for inter-device communications within an SoC (e.g., Advanced Microcontroller Bus Architecture or "AMBA," QuickPath Interconnect or "QPI," HyperTransport or "HT," etc.).

Devices coupled to internal interconnect fabric 203 may communicate with each other and with a host OS executed by CPU clusters 201A-N. In some cases, devices 209-211 may be coupled to internal interconnect fabric 203 via a secondary interconnect fabric (not shown). A secondary interconnect fabric may include any bus suitable for inter-device and/or inter-bus communications within an SoC.

GPU 204 produces graphical or visual content and communicates that content to a monitor or display of IHS 100 for rendering. In some embodiments, display engine or controller 209 may be designed to perform additional video enhancement operations. In operation, display engine 209 may implement procedures for providing the output of GPU 204 as a video signal to one or more external displays coupled to IHS 100 (e.g., display device(s) 111). PCIe interfaces 205 provide an entry point into any additional devices external to heterogenous computing platform 200 that have a respective PCIe interface (e.g., graphics cards, USB controllers, etc.).

Audio Digital Signal Processor (aDSP) 206 is a device designed to perform audio and speech operations and to perform in-line enhancements for audio input(s) and output(s). Examples of audio and speech operations include, but are not limited to: noise reduction, echo cancellation, directional audio detection, wake word detection, muting and volume controls, filters and effects, etc. In operation, input and/or output audio streams may pass through and be processed by aDSP 206, which can send the processed audio to other devices on internal interconnect fabric 203 (e.g., CPU clusters 201A-N).

In some embodiments, aDSP 206 may be configured to process one or more of heterogenous computing platform 200's sensor signals (e.g., gyroscope, accelerometer, pressure, temperature, etc.), low-power vision or camera streams (e.g., for user presence detection, onlooker detection, etc.), or battery data (e.g., to calculate a charge or discharge rate, current charge level, etc.).

Camera device 210 includes an Image Signal Processor (ISP) configured to receive and process video frames captured by a camera coupled to heterogenous computing platform 200 (e.g., in the visible and/or infrared spectrum). Video Processing Unit (VPU) 211 is a device designed to perform hardware video encoding and decoding operations, thus accelerating the operation of camera 210 and display/graphics device 209. VPU 211 may be configured to provide optimized communications with camera device 210 for performance improvements.

Sensor hub 207 may include AI capabilities designed to consolidate information received from other devices in heterogenous computing platform 200, process context and/or telemetry data streams, and provide that information to: (i) a host OS, (ii) other applications, and/or (iii) other devices in platform 200. In collecting data, sensor hub 207 may include General-Purpose Input/Output (GPIOs) that provide Inter-Integrated Circuit ($I^2C$), Improved $I^2C$ ($I^3C$), Serial Peripheral Interface (SPI), Enhanced SPI (eSPI), and/or serial interfaces to receive data from sensors (e.g., sensors 110, camera 210, peripherals 214, etc.). Sensor hub 207 may include a low-power core configured to execute small neural networks and specific applications, such as contextual awareness and other enhancements.

High-performance AI device 208 is a significantly more powerful processing device than sensor hub 207, and it may be designed to execute multiple complex AI algorithms and models concurrently (e.g., Natural Language Processing, speech recognition, speech-to-text transcription, video processing, gesture recognition, user engagement determinations, etc.). For example, high-performance AI device 208 may include a Neural Processing Unit (NPU), Tensor Processing Unit (TPU), Neural Network Processor (NNP), or Intelligence Processing Unit (IPU), and it may be designed specifically for AI and Machine Learning (ML), which speeds up the processing of AI/ML tasks while also freeing processor(s) 101 to perform other tasks. Using such capabilities, one or more devices of heterogenous computing platform 200 (e.g., GPU 204, aDSP 206, sensor hub 207, high-performance AI device 208, VPU 211, etc.) may be configured to execute one or more AI model(s), simulation(s), and/or inference(s).

Security device 212 may include one or more specialized security components, such as a dedicated security processor, a Trusted Platform Module (TPM), a TRUSTZONE device, a PLUTON processor, or the like. In various implementations, security device 212 may be used to perform cryptography operations (e.g., generation of key pairs, validation of digital certificates, etc.) and/or it may serve as a hardware RoT for heterogenous computing platform 200 and/or IHS 100.

Modem/wireless controller 213 may be designed to enable wired and wireless communications in any suitable frequency band (e.g., BLUETOOTH or "BT," WiFi, CDMA, 5G, satellite, etc.), subject to AI-powered optimizations/customizations for improved speeds, reliability, and/or coverage.

Peripherals 214 may include any device coupled to heterogenous computing platform 200 (e.g., sensors 110) through mechanisms other than PCIe interfaces 205. In some cases, peripherals 214 may include interfaces to integrated devices (e.g., built-in microphones, speakers, and/or cameras), wired devices (e.g., external microphones, speakers, and/or cameras, Head-Mounted Devices/Displays or "HMDs," printers, displays, etc.), and/or wireless devices (e.g., wireless audio headsets, etc.) coupled to IHS 100.

In some implementations, EC 109 may be integrated into heterogenous computing platform 200 of IHS 100. In other implementations EC 109 may be external to the heterogenous computing platform 200 (i.e., the EC 109 residing in its own semiconductor package) but coupled to integrated bridge 216 via an interface (e.g., enhanced SPI or "eSPI"), thus supporting the EC's ability to access the SoC's interconnect fabric 203, including sensor hub 207 and sensor(s) 110. Through this connectivity supported by interconnect fabric 203, EC 109 may directly access and/or operate most or all of devices 201-216, 110 of heterogenous computing platform 200.

Figure 3:
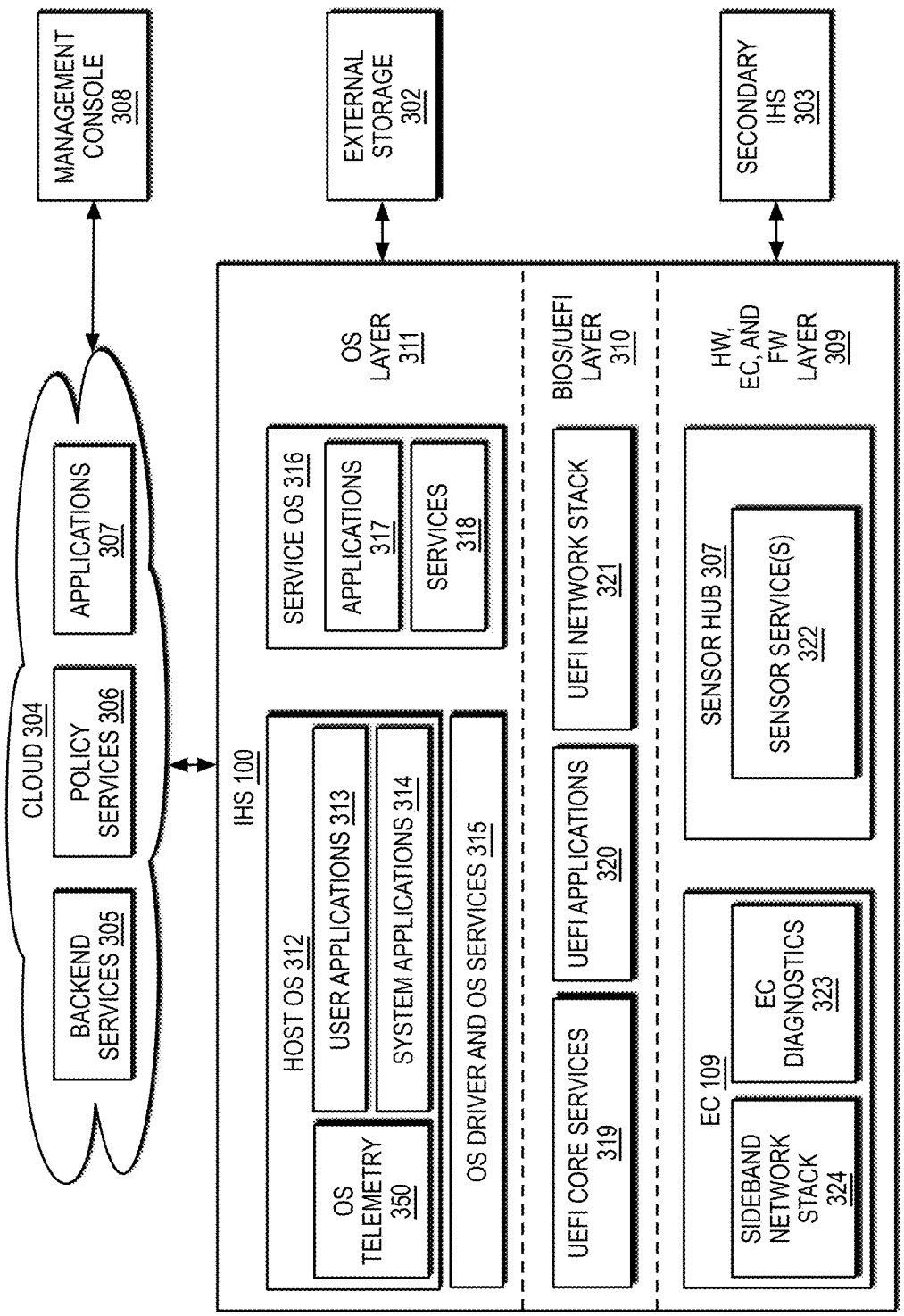
FIG. 3 is a diagram illustrating an example of a software and firmware architecture of an IHS, according to some embodiments.

FIG. 3 is a diagram illustrating an example of architecture 300 usable with IHS 100. Particularly, architecture 300 includes IHS 100 (e.g., implementing aspects of IHS 100 and/or platform 200) coupled to storage device 302 (e.g., NVMe, SSD, etc.), secondary or companion IHS 303 (e.g., a smart phone, a laptop, etc.), and cloud or remote services 304. Cloud 304 may include backend or remote services 305, policy services 306, and web applications 307. In some cases, components of cloud 304 may be accessible to IHS 100 and/or secondary IHS 303, and configurable via ITDM management console 308.

IHS 100 may include hardware/EC/firmware layer 309, BIOS/UEFI layer 310, and OS layer 311. Specifically, OS layer 311 includes host OS 312 executed by host processor(s) 101. A variety of software applications may operate within OS 312, where these applications may include user applications 313 and system applications 314. Applications that operate within the OS 312 may also include one or more telemetry applications 350.

OS layer 311 may also include various drivers and other core OS operations, such as the operation of a kernel. As described, various components of heterogenous computing platform 200 may independently run their own OS, such as a Real-Time OS (RTOS) run by an SoC.

Within IHS 100, RTOSs executed by individual components of the heterogenous computing platform 200 are deemed distinct from service OS 316, which includes its own applications 317 and services 318. Hardware device drivers 315 used by host OS 312 and/or by service OSs 316 may support the operation of IHS 100 hardware.

BIOS/UEFI layer 310 may include pre-OS core services 319, pre-OS applications 320, and pre-OS network stack 321 that are each executed by BIOS/UEFI 107. BIOS core services 319 may include operations for identifying and validating the detected hardware components of IHS 100.

BIOS applications 320 may include operations for interfacing with certain hardware devices of IHS 100, in particular user input devices. The network stack 321 of BIOS 310 may be utilized during initialization of IHS 100 in support of validation procedures, such as in retrieving reference signatures corresponding to authentic firmware instructions for hardware components of IHS 100.

As illustrated, IHS 100 also includes a hardware/EC/firmware layer 309 with EC 109 and sensor hub 207. As described above, EC 109 may implement a variety of procedures for management of individual hardware of IHS 100. EC 109 is configured to execute one or more sensor services 323 that interface with sensor hub 207 in implementing various operations, such response to user-presence determination by the sensor hub 207 that is acted upon by the EC 109 in initiation heightened security protocols. Moreover, EC 109 may interface with some or all individual hardware components/systems of IHS 100 via sideband management channels that are separate from inline communication channels used by host processor(s) 101 and SoCs.

As described above, sensor hub 207 may receive inputs from some or all sensors 110A-N of an IHS 100. Sensor hub 207 may implement a variety of sensor service(s) 322 for communicating with and collecting data from sensors 110A-N. In some embodiments, sensor hub 207 may implement shock detection procedures that may incorporate inputs from inertial and other sensors 110A-N of IHS 100. Shock detection procedures may detect shocks experienced by IHS 100 and may characterize and assess possible damage to IHS 100.

In various embodiments, BIOS/UEFI 107 may collect device health information during the booting of IHS 100 (e.g., upon power-on or reset). In various implementations, BIOS/UEFI 107 may gather and store that data in the form of an Advanced Configuration and Power Interface (ACPI) table (e.g., a Platform Health Assessment Table or "PHAT"), or the like. Examples of device health data include any data and/or telemetry related to the operation and/or status of a device (e.g., processor, memory, hard drives, display, PCI devices, cables, cooling fans, battery, etc.), such as data resulting from each device's Power-On Self-Test (POST), or the like.

After the boot sequence is completed, host OS 312 may retrieve the ACPI table from BIOS/UEFI 107 (e.g., via a kernel driver) and parse its contents to extract the device health information collected during boot. In some cases, a host OS application may then transmit at least a portion of the device health data to an OEM's backend service, or the like.

In today's IHS ecosystem, however, there are multiple different types of platforms and processors (e.g., x86, ARM, etc.), and each such platform or processor may have a different BIOS/UEFI 107. Moreover, each BIOS/UEFI 107 may implement a different flavor of ACPI table, each table having different, additional, and/or custom fields and values.

To address these, and other concerns, systems and methods described herein provide handling platform-agnostic pre-boot health information in IHS 100. In various embodiments, each different BIOS/UEFI 107 may populate an identifier field in the ACPI table. For example, the identifier may indicate a type, a model, or a vendor of host processor 101 and/or heterogeneous computing platform 200.

Additionally, or alternatively, the identifier may indicate a parser usable to parse the ACPI table, which man include parser versioning information. The parser may be implemented as a program or routine that breaks down text into recognized strings of characters, such as in the ACPI table, for further analysis.

Additionally, or alternatively, in the case of in an asymmetric multiprocessor IHS, multiple identifiers may be used to identify different CPUs/SoCs and/or corresponding parsers in a single and/or multiple ACPI tables. Additionally, or alternatively, for devices that are deemed boot-critical (e.g., single points of failure, etc.), identifier(s) may be used to help select additional parsers ("sub-parsers") that can parse and extract health data specifically and/or exclusively for those devices.

As IHS 100 boots through its various boot phases, BIOS/UEFI 107 may collect data from various devices (e.g., POST data) and populate the ACPI table, such as a vendor-specific ACPI table having a vendor-specific schema. In some implementations, device health data may be representative of boot progress.

After host OS 312 takes over, it may pull the ACPI table from BIOS/UEFI 107 through a kernel driver, and it may extract the identifier(s) from the table. Based upon the identifier(s), host OS 312 may select one or more of a plurality or parsers to process the ACPI table. The selected parser(s) may be configured to use vendor-specific ACPI table schema(s) followed when table was created and populated by BIOS/UEFI 107. Also, if an identifier indicates a later version, host OS 312 may update the parser before processing the ACPI table.

The selected parser extracts the device health information from the ACPI table using the corresponding vendor-specific schema. As such, systems and methods described herein may create CPU-independent health assessment tables, one for each different SoC vendor (e.g., INTEL, AMD, QUALCOMM, etc.). In some cases, further analysis of a CPU-independent health assessment tables may trigger a host or service OS-based diagnostics operation.

Figure 4:
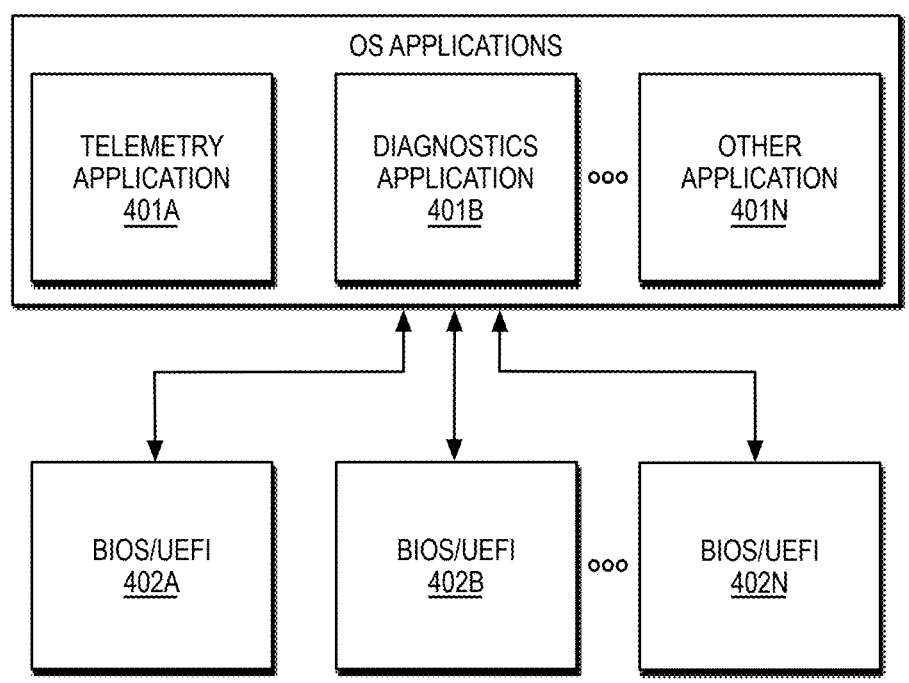
FIG. 4 is a diagram illustrating an example of a system for handling platform-agnostic pre-boot health information in an IHS, according to some embodiments.

In that regard, FIG. 4 is a diagram illustrating an example of system 400 for handling platform-agnostic pre-boot health information in IHS 100. As shown, telemetry application 401A, diagnostics application 401B, and other application 401N are host OS 312 applications configured to access any of BIOS/UEFIs 402A-N, for example, though a kernel driver (e.g., one of drivers 315 in FIG. 3). In various embodiments, any of BIOS/UEFIs 402A-N may perform operations of method 500 shown in FIG. 5, whereas any of OS applications 401A-N may perform operations of method 600 shown in FIG. 6.

Figure 5:
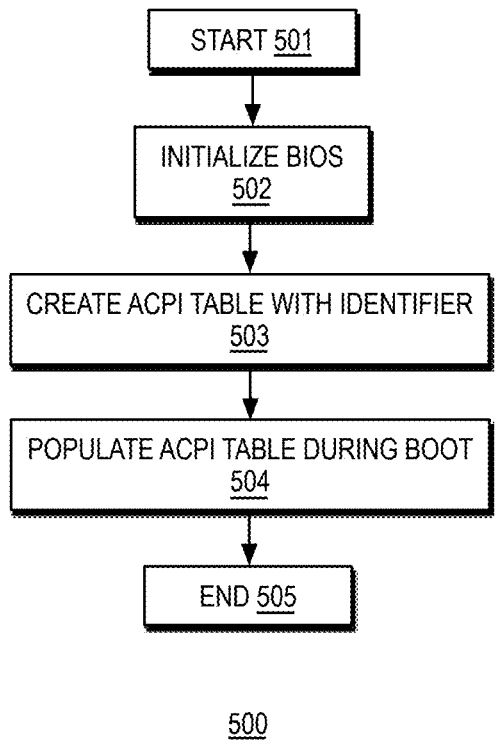
FIGS. 5 and 6 are diagrams illustrating examples of methods for handling platform-agnostic pre-boot health information in an IHS, according to some embodiments.

FIG. 5 is a diagram illustrating an example of method 500 for handling platform-agnostic pre-boot health information in IHS 100. In various embodiments, method 500 may be executed, at least in part, by BIOS/UEFIs 402A-N.

Method 500 starts at 501. At 502, BIOS/UEFIs 402A-N is initialized and follows a boot sequence to start up components of IHS 100 in a predetermined order, verify whether devices are present and their operational status, etc.

In some cases, each device may execute a self-test, such as a POST, and store results of that test in a local register where BIOS/UEFIs 402A-N can retrieve it from. Additionally, or alternatively, BIOS/UEFIs 402A-N may include one or more diagnostics or telemetry collection tools to initiate tests and/or receive device health data.

At 503, BIOS/UEFIs 402A-N may create an ACPI table (e.g., a PHAT) and add to it an identifier that can indicate to host OS 312. Later, this identifier may be used by host OS 312 to select one of a plurality of parsers to use with a particular table schema, which may vary depending upon the processor and/or platform of IHS 100.

At 504, BIOS/UEFIs 402A-N populate telemetry portion of the ACPI table with device health data collected during various boot phases, which may serve to indicate the IHS's boot progress. In some implementations, certain devices may be deemed critical to the boot path or sequence of IHS 100 (e.g., single-point of failures) while others may not. Accordingly, in some cases, at 504 method 500 may only collect and/or report device health data for the subset of devices deemed critical (e.g., processors, memories, hard drives, etc.). Method 500 ends at 505.

Figure 6:
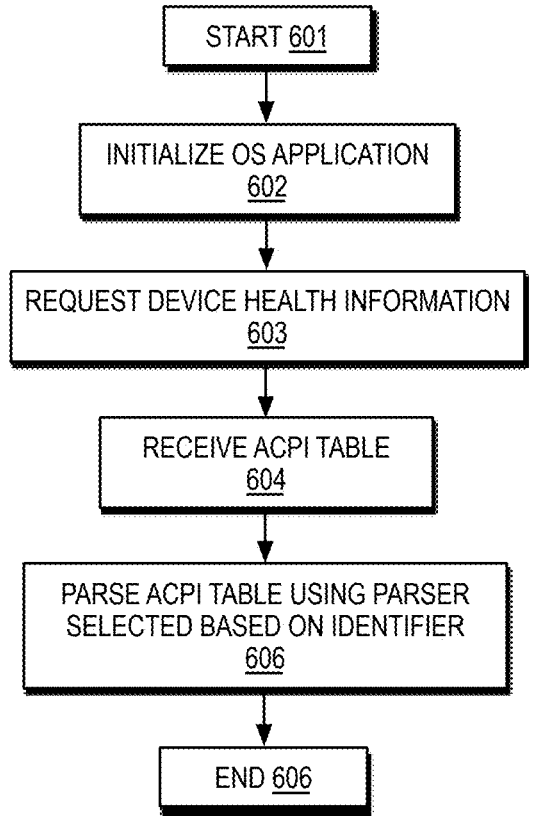

FIG. 6 is a diagram illustrating an example of method 600 for handling platform-agnostic pre-boot health information in IHS 100. In various embodiments, method 600 may be executed, at least in part, by OS applications 401A-N.

Particularly, method 600 starts at 601. At 602, at least one of applications 401A-N is initialized. Here it should be noted that applications 401A-N may include host OS applications 313/314 and/or service OS applications 317.

At 603, application(s) 401A-N request device health information, for example, by invoking an Application Programming Interface (API) call of a kernel driver 315 in host OS 312, or services 318 in service OS 316. In response, at 604, the kernel driver retrieves an ACPI table from BIOS/UEFIs 402A-N and provides it to application 401A-N.

At 605, application 401A-N may retrieve the identifier from the ACPI table and select one of a plurality of parsers specifically configured to operate on that table's schema and to extract device health data from it. Method 600 ends at 606.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks.

Program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices.

Similarly, operational data may be identified and illustrated herein within modules and may be embodied in any suitable form and organized within any suitable type of data structure. Operational data may be collected as a single data set or may be distributed over different locations including over different storage devices.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination thereof. Such configured devices are physically designed to perform the specified operation(s).

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:
a processor; and
a memory coupled to the processor, the memory having program instructions stored thereon that, upon execution, cause the IHS to:
create an Advanced Configuration and Power Interface (ACPI) table, by a Basic Input/Output System (BIOS) during boot of the IHS, wherein the ACPI table comprises telemetry data and an identifier; and provide the ACPI table to an Operating System (OS) application, wherein the OS application is configured to select one of a plurality of parsers to process the ACPI table based, at least in part, upon the identifier.

2. The IHS of claim 1, wherein the OS application comprises a diagnostics or telemetry application.

3. The IHS of claim 1, wherein the identifier provides an indication of at least one of: a type of the processor, a model of the processor, or a vendor of the processor.

4. The IHS of claim 1, wherein the identifier provides an indication of a schema of the ACPI table.

5. The IHS of claim 1, wherein the telemetry data comprises device health data retrieved from a device in a boot path of the IHS.

6. The IHS of claim 5, wherein the device health data comprises data collected by the device during a Power-On Self-Test (POST) of the device.

7. The IHS of claim 1, wherein the ACPI table comprises a Platform Health Assessment Table (PHAT).

8. The IHS of claim 1, wherein the ACPI table comprises a vendor-specific ACPI table.

9. The IHS of claim 8, wherein the BIOS is configured to add device health information for devices in a boot path to the vendor-specific ACPI table during the boot.

10. The IHS of claim 1, wherein in response to the identifier indicating a first type, first model, or first vendor of the processor, the OS application is configured to select a first parser, and wherein in response to the identifier indicating a second type, second model, or second vendor of the processor, the OS application is configured to select a second parser.

11. The IHS of claim 10, wherein the first type, first model, or first vendor of the processor identifies a Complex Instruction Set Computer (CISC) processor, and wherein the second type, second model, or second vendor of the processor identifies a Reduced Instruction Set Computer (RISC) processor.

12. The IHS of claim 1, wherein the identifier indicates a version of the parser, and wherein the OS application is configured to update the selected parser to the version in response to the identifier.

13. In an Information Handling System (IHS), a method comprising:

creating an Advanced Configuration and Power Interface (ACPI) table, by a Basic Input/Output System (BIOS) during boot of the IHS, wherein the ACPI table comprises telemetry data and a System-on-Chip (SOC) vendor value; and providing the ACPI table to an Operating System (OS) application, wherein the OS application is configured to select one of a plurality of parsers to process the ACPI table based, at least in part, upon the value.

14. The method of claim 13, wherein the telemetry data comprises device health data, wherein the device health data comprises data collected by a device during a Power-On Self-Test (POST) of the device, and wherein the device is selected among: a battery, a hard drive, a memory, a Peripheral Component Interconnect (PCI) controller, a cable, or a cooling fan.

15. The method of claim 13, wherein the BIOS is configured to add device health information for devices in a boot path to the ACPI table during the boot.

16. The method of claim 13, wherein in response to the value indicating a first type, first model, or first vendor, the OS application is configured to select a first parser, and wherein in response to the value indicating a second type, second model, or second vendor, the OS application is configured to select a second parser.

17. A hardware memory device having program instructions stored thereon that, upon execution by a processor, cause the processor to:

request, by an Operating System (OS) application, device health data; and provide, to the OS application from a Basic Input/Output System (BIOS), an Advanced Configuration and Power Interface (ACPI) table, wherein the ACPI table comprises telemetry data and an identifier of the processor, and wherein the OS application is configured to select one of a plurality of parsers to process the ACPI table based, at least in part, upon the identifier.

18. The hardware memory device of claim 17, wherein the processor comprises an asymmetric multiprocessor, and wherein the identifier is usable to identify at least one of: each processor of the asymmetric multiprocessor, or each parser usable to parse an ACPI table or a portion thereof corresponding to each processor.

19. The hardware memory device of claim 17, wherein in response to the identifier indicating a first type, first model, or first vendor of the processor, the OS application is configured to select a first parser, and wherein in response to the identifier indicating a second type, second model, or second vendor of the processor, the OS application is configured to select a second parser.

20. The hardware memory device of claim 19, wherein the first type, first model, or first vendor of the processor identifies a Complex Instruction Set Computer (CISC) processor, and wherein the second type, second model, or second vendor of the processor identifies a Reduced Instruction Set Computer (RISC) processor.

* * * * *